United States Patent [19]
Knebelkamp

[11] Patent Number: 5,561,430
[45] Date of Patent: *Oct. 1, 1996

[54] INDUCTOR/ANTENNA FOR A RECOGNITION SYSTEM

[75] Inventor: Michael Knebelkamp, Freising, Germany

[73] Assignee: Texas Instruments Deutschland GmbH, Germany

[ * ] Notice: The term of this patent shall not extend beyond the expiration date of Pat. No. 5,461,386.

[21] Appl. No.: 485,519

[22] Filed: Jun. 7, 1995

Related U.S. Application Data

[62] Division of Ser. No. 193,322, Feb. 8, 1994, Pat. No. 5,461,386.

[51] Int. Cl.⁶ .................................................. G01S 13/74
[52] U.S. Cl. .......................................... 342/44; 340/825.31
[58] Field of Search ................................ 342/44, 42, 51; 340/825.31

[56] References Cited

U.S. PATENT DOCUMENTS

| | | | |
|---|---|---|---|
| 4,738,334 | 4/1988 | Weishaupt | 180/287 |
| 4,980,680 | 12/1990 | Knoll et al. | 340/825 |
| 4,996,514 | 2/1991 | Sunami | 340/426 |
| 5,025,492 | 6/1991 | Viereck | 342/144 |
| 5,053,774 | 10/1991 | Schuemann et al. | 342/44 |
| 5,073,781 | 12/1991 | Stickelbrocks | 342/51 |
| 5,126,745 | 6/1992 | Steinhagen et al. | 342/51 |
| 5,148,404 | 9/1992 | Hilferink et al. | 367/2 |
| 5,168,282 | 12/1992 | Viereck | 343/745 |
| 5,170,492 | 12/1992 | Moller et al. | 455/76 |
| 5,170,493 | 12/1992 | Roth | 455/82 |
| 5,196,735 | 3/1993 | Meier et al. | 307/260 |
| 5,270,717 | 12/1993 | Schuermann | 342/22 |
| 5,287,112 | 2/1994 | Schuermann | 342/42 |
| 5,347,263 | 9/1994 | Carroll et al. | 340/572 |
| 5,365,235 | 11/1994 | Kennedy et al. | 342/44 |
| 5,461,386 | 10/1995 | Knebelkamp | 342/44 |

Primary Examiner—Mark Hellner
Attorney, Agent, or Firm—Bret J. Petersen; James C. Kesterson; Richard L. Donaldson

[57] ABSTRACT

An improved inductor/antenna (100) improves the selectivity of a recognition system (10) by ensuring that only the transponder (14) closest to the inductor/antenna (100) of an interrogator (12) receives therefrom, and reacts to, an interrogation signal (S1). The improved inductor/antenna (100) also receives the resulting recognition signal (S2) from the transponder (14) for analysis by the interrogator (12). The inductor/antenna (100) includes two or more coils (102, 104; 124, 126, 128, 130; 132, 134) which may be wound on ferromagnetic cores (108), spaced around a metal mass (46, 48) such as a lock cylinder (46) of an ignition switch (24). The shape, number, location and relative winding sense of the coils are selected to shape and locate the energy field (F; 118, 122) radiated by the inductor/antenna (100) so that only the transponder (14) in a key (26) which is inserted into or operating the ignition switch (24) responds to the interrogation signal (S1) radiated by the inductor/antenna (100).

52 Claims, 6 Drawing Sheets

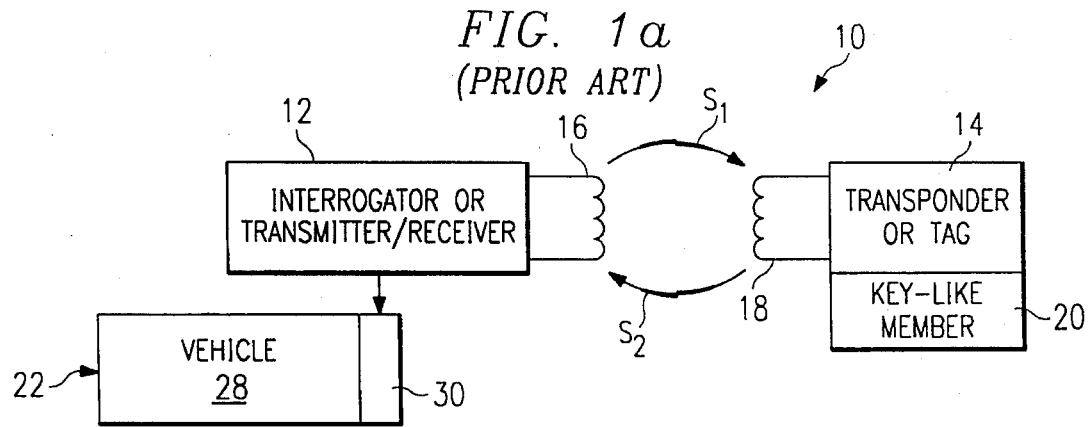
FIG. 1a (PRIOR ART)
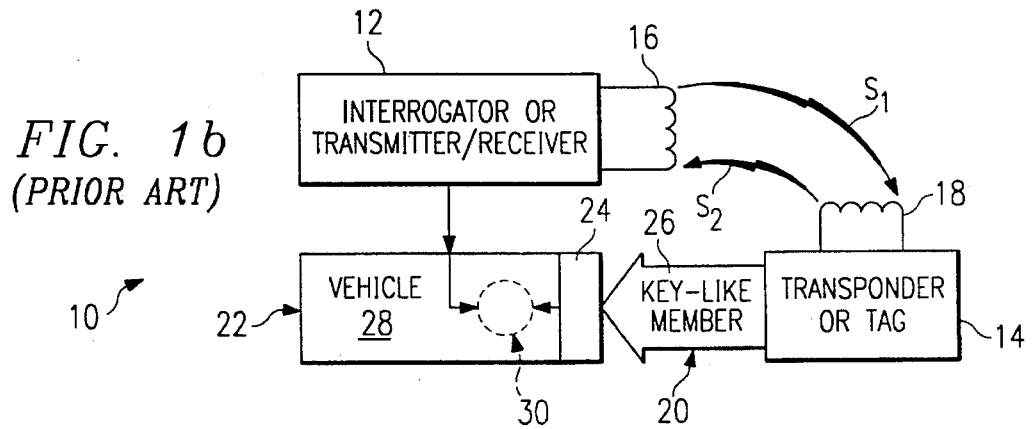
FIG. 1b (PRIOR ART)
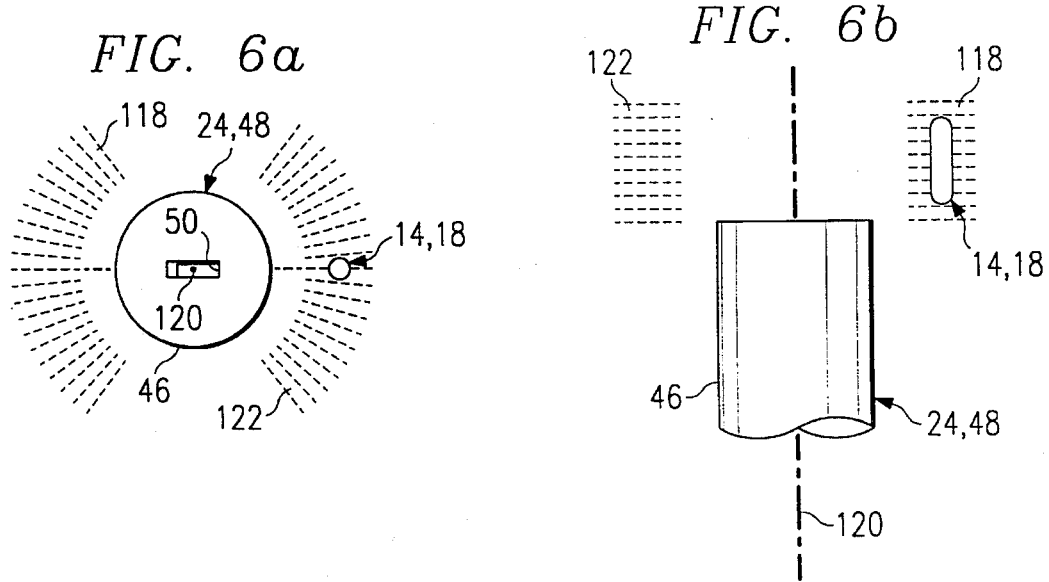
FIG. 6a
FIG. 6b

INDUCTOR/ANTENNA FOR A RECOGNITION SYSTEM

This is a division, of application Ser. No. 08/193,322, filed Feb. 8, 1994 now U.S. Pat. No. 5,461,386.

BACKGROUND OF THE INVENTION

The present invention relates to an improved inductor or antenna for a recognition system, and, more particularly, to an improved inductor or antenna for a recognition system, which system is usable in conjunction with an ignition switch or similar control mechanism for a vehicle or other facility, which inductor or antenna increases the ability of the system to recognize and respond to a key, or similar item, which "matches" the ignition switch or other control mechanism.

Various types of recognition systems are taught by the following commonly assigned U.S. Patents and Applications: U.S. Pat. Nos. 5,287,112; 5,270,717; 5,196,735; 5,170,493; 5,168,282; 5,126,745; 5,073,781; 5,053,774; 5,025,492; Ser. No. 08/021,123, filed Feb. 23, 1993 [TI-17529]; Ser. No. 08/065,286, filed May 21, 1993 [TI-16981]; and Ser. No. 08/086,786, filed Jul. 2, 1993 [TI-17507]. Systems conforming to the teachings of the foregoing documents are marketed under the name TIRIS ("Texas Instruments Register and Identification System"). A recognition system similar in result to, but structurally and functionally specifically different from, TIRIS is disclosed in U.S. Pat. No. 4,918,955. Other types of recognition systems include systems known as AVI (for "Automatic Vehicular Identification"), as taught, for example, by commonly assigned U.S. Pat. No. 5,287,112 and commonly assigned U.S. applications Ser. No. 08/021,123, filed Feb. 23, 1993.

In one type of TIRIS recognition system of interest, a transmitter/receiver (also referred to herein, in the claims hereof and elsewhere as an "interrogator" or a "reader") selectively radiates energy via an associated first inductor or antenna (referred to herein and in the claims hereof as an "inductor/antenna"). The energy is radiated from the vicinity of a key-operated lock, such as a vehicle ignition switch. The radiated energy is often referred to as an "interrogation signal." The radiated energy is received by a second inductor or antenna present on or in a key. The key also includes facilities, such as circuitry (sometimes called a "transponder" or "tag"), connected to the second inductor or antenna. An electrical signal produced or induced in the key's circuitry by the received energy either is affected (e.g., increased or decreased) by the circuitry or effects the generation of a stored, uniquely coded signal by the circuitry. The affected or coded signal is often referred to as a "recognition signal."

Depending on the constituents of the key's circuitry, either the recognition signal is transmitted or reflected back to the transmitter/receiver via the second and first inductors or antennas. A key "matching" the particular ignition switch transmits or causes a predetermined recognition signal. Other keys which operate other ignition switches associated with similar recognition systems may similarly respond to the interrogation signal but transmit recognition signals different from the predetermined recognition signal.

The transmitter/receiver includes facilities which analyze the recognition signals received thereat to determine if the analyzed signal is the predetermined recognition signal produced by the matching key. If the analyzed signal is the predetermined recognition signal, the concurrence of such predetermined recognition signal and the operation of the ignition switch by the matching key starts the engine of the vehicle. If the analyzed signal is not the predetermined recognition signal, either the ignition switch cannot be operated by the key, or, if it can be operated, such operation is ineffective to start the engine.

Portability and/or space limitations usually result in the transmitter/receiver of a TIRIS-type of recognition system being not very powerful. Also, the recognition signals, that is the signals transmitted or reflected back to the transmitter/receiver from the key-included circuitry, may be derived from the limited energy radiated from the transmitter/receiver, not from energy derived from a key-contained power source, such as a battery, as is typical in systems of the AVI type. While the use of a battery with key-included circuitry of a TIRIS system is technically possible, the large size and resulting unwieldiness of the resulting key would probably lead to rejection by users. As a consequence of the foregoing, the key's inductor or antenna and the inductor or antenna of the transmitter/receiver must typically be in close proximity to efficiently electrically couple together the first and second inductors or antennas. Depending on the type of recognition system, such close proximity may range from an inch or a fraction thereof to 18–24 inches.

The keys used with the above type of recognition system may include various types of circuitry, each of which cooperates with an appropriate transmitter/receiver. In a first type of key-included circuitry, wherein the key is a tag selectively removable from merchandise which has been properly purchased, passive components attenuate some electrical value, such as current, which is produced by the energy received in the second inductor or antenna. In effect, the key's circuitry is a load inductively coupled to the transmitter/receiver. A second type of key-included circuitry comprises components which electrically resonate at selected frequencies of the received energy to increase the current produced by the received energy. See, for example, U.S. Pat. No. 4,918,955.

In the foregoing first two types of recognition systems, the attenuated or increased current is reflected or transmitted as a corresponding decrease or increase of energy by the second inductor or antenna back to the first inductor or antenna, where the receiver perceives the resulting recognition signal and compares it to stored data representing the recognition signal which should be produced if the key "matches" the lock.

In the foregoing first type of current-attenuating recognition system, the key's circuitry includes passive components which simply load the transmitter/receiver via the inductive coupling between the inductors or antennas. If the effect of this loading on the transmitter/receiver—for example, a decrease in a signal in the transmitter/receiver which signal is responsible for the energy radiation—is of a selected type and/or magnitude, this fact is detected or measured and analyzed by circuitry in the transmitter/receiver as the recognition signal.

In the foregoing second type of current-increasing recognition system, exemplified by U.S. Pat. No. 4,918,955, the key's circuitry includes plural resonant circuits. The frequency of the energy received by the second inductor or antenna is swept by the receiver/transmitter across a frequency spectrum which includes the frequencies at which the resonant circuits resonate. The increases of the current in the key's circuitry during resonance and the resulting increases in the energy transmitted back to the transmitter/receiver are analyzed by the transmitter/receiver and compared with stored data to determine if the recognition signal has been produced.

A third type of key-included circuitry comprises active and passive components, which in response to the receipt of energy from the transmitter/receiver produce a coded signal. See the above-noted commonly assigned U.S. Patents and Applications. The coded signal, which may be produced by data stored in memory, is transmitted back to the transmitter/receiver, where comparison with the stored "matching" signal is carried out. The coded signal may be produced by modulating a carrier with the stored code, and the carrier may be, or may be derived from, the energy received by the key-included facilities from the transmitter/receiver. In this latter event, the system may be of the TIRIS variety, and the key and its circuitry require no on-board power source and may be said to be "batteryless." This third type of system may also be of the AVI variety, in which case the transponder is typically powered by a self-contained power source.

Recognition systems of the third type may be of the half-duplex variety. That is, after the transmitter/receiver operates in a transmitter mode so that the energy is radiated from the first inductor or antenna to the second inductor or antenna, it ceases operating as a transmitter and operates in a receiver mode to receive and analyze the recognition signal produced by the key-included circuitry. The radiated energy may be modulated RF. The frequency of the carrier radiated by the transmitter/receiver and by the key-included circuitry may be the same or different. Half-duplex recognition systems are disclosed in the above-noted commonly assigned patents and applications except the following applications: Ser. No. 08/021,123 [TI-17529]; Ser. No. 08/065,286 [TI-16981]; and Ser. No. 08/086786 [TI-17507].

Recognition systems of the third type may also be of the full-duplex variety. Specifically, the transmitter/receiver may simultaneously operate as both a transmitter and a receiver, that is, it may simultaneously radiate energy to the key-included circuitry and receive for analysis the corresponding signal produced by such circuitry. Typically, in full-duplex operation, the frequency of the modulated carrier radiated by the transmitter/receiver to the key-included circuitry is different from the frequency of the modulated carrier produced by the key-included circuitry and thereafter received and analyzed by the receiver/transmitter. See above-noted commonly assigned application Ser. No. 08/012,123 [TI-17529].

Recognition systems of the third type may also selectively operate in either a half-duplex mode or in a full-duplex mode depending on which of a variety of key-included circuitry is being utilized. See above-noted commonly assigned applications Ser. No. 08/065,286 [TI-16981] and Ser. No. 08/086,786 [TI-17507].

In prior recognition systems used with a control mechanism such as the ignition switch of a vehicle, the first inductor or antenna may include a coil which surrounds the ignition switch which is connected to the transmitter/receiver. A ferromagnetic core may be interposed between the coil and the switch. The coil alone, or the core+coil constitutes the first inductor or antenna. The physical proximity of the first inductor or antenna to the point of key insertion has been generally expedient, because, as a key containing a transponder is brought close to, and is then inserted into, the insertion point, the core+coil (i.e., the first inductor or antenna) and the second inductor or antenna are physically quite close. As disclosed in above-noted U.S. Pat. No. 4,918,955, such physical closeness may constitute physical engagement of the inductors. Physical closeness efficiently couples the energy radiated from the first inductor to the second inductor.

Several disadvantages have been found by the present inventor to be present in the foregoing type of first inductor or antenna. First, where the first and second inductors are intended to physically contact, as in the '955 patent, failure to achieve such contact may adversely affect the operation of the recognition system. Second, where the first inductor is of the core+coil type as in the '955 patent, but the first and second inductors are not intended to physically engage, as in some of the commonly assigned patents and applications, the energy which is radiated to, and received back from, the key-included circuitry by the core+coil is damped and attenuated by the metal mass of the surrounded ignition switch and its lock. Such damping and attenuation may require large amplification in either the transmitter/receiver or the key-included circuitry, an expensive and potential size-compromising expedient.

Third, the energy radiated by the first inductor or antenna may effect the operation of circuitry included with a second key usable with another ignition switch which is associated with another recognition system. The foregoing may occur, for example, where the user's key ring contains keys used to operate two different automobiles. If the second key is efficiently coupled to the first inductor or antenna, the signals analyzed by the transmitter/receiver will comprise signals from the transponder of the second key superimposed on the signals from the transponder of the first "matching" key. The analysis of the superimposed signals can result in the transmitter/receiver not permitting the "matching" key to operate the ignition switch.

Fourth, ignition switches included in various vehicles may vary in size or configuration. These variations require that there be available first inductors or antennas having cores of varying diameters, as well as a varying number of turns.

SUMMARY OF THE INVENTION

Unlike TIRIS and similar systems, the transponder of an AVI system is usually not batteryless, and AVI interrogators and transponders typically communicate with each other over far greater distances than do their counterparts in TIRIS and similar systems. Nevertheless, although the inductor/antenna of the present invention is disclosed herein in conjunction with TIRIS-like systems, it is usable with the other types of referenced recognition systems.

The foregoing disadvantages are eliminated by the improved inductor of the present invention. The improved inductor, which preferably functions as an antenna, is used with a transmitter/receiver (an "interrogator" or "reader") of a recognition system.

Specifically, the transmitter/receiver is associated with a control mechanism, which may be a lock. The control mechanism is operable by a properly positioned, matching key-like member to control a device. The key-like member may be a key, proper positioning of which comprises its insertion into the lock. The controlled device may be a motor vehicle the operation of which is controlled by operation of an ignition switch via operation of the lock by an inserted, matching key.

The matching key-like member and other, non-matching key-like members each include facilities, such as circuitry (including a "transponder" or "tag") which receive energy radiated from the first inductor by the first transmitter/ receiver. Energy reception occurs when any of the key-like members are in the vicinity of the control mechanism.

The receipt of energy by the facilities included in each key-like member leads to the production by the facilities in the transmitter/receiver of a respective unique recognition signal for each key-like member. Each recognition signal may result from the operation of the key-included facilities in a signal-affecting (signal-attenuating or signal-increasing) mode or in a code generation mode, and in the latter event the transmitter/receiver add the key-included facilities may operate in a half-duplex and/or full-duplex mode, all as described above.

Control of the device is possible only upon the simultaneous occurrence of (a) operation of the control mechanism by the matching key-like member and (b) production in the transmitter/receiver of only the recognition signal unique to the matching key-like member.

In its broadest aspect, the improved inductor maximizes the energy transmitted or radiated by the inductor at a selected region external to the control mechanism. The selected region preferably coincides with the location of the key-like member-included facilities of a key-like member which is properly positioned to operate the control mechanism and/or which is operating the control mechanism. If the control mechanism is a lock operable by a key, the selected region generally coincides with the facilities included in a key which is inserted into the lock and/or is operating the lock.

The improved inductor also minimizes the energy transmitted or radiated to regions other than the selected region. In the case of a key-operable lock, these other regions, which may be regions more remote from the lock, are those that are not occupied by the key-included facilities or transponder when the key is inserted into the lock and/or operating the lock.

The foregoing maximizes the probability that the recognition signal produced in the transmitter/receiver is produced only by the facilities included in the key-like member that is properly positioned and is currently being used to operate the control mechanism, even though one or more other key-like members are in the vicinity of the properly positioned key-like member. If the matching key-like member is involved in the attempt to operate the control mechanism, the improved inductor prevents non-matching key-like members from defeating that attempt. Where a key is used to operate a lock, the improved inductor or antenna prevents keys which are not inserted into the lock and/or are operating the lock from interfering with the effect on the transmitter/ receiver of a key inserted into the lock and/or operating it.

In some specific embodiments the maximizing/minimizing functions are effected by plural, electrically interconnected coils which function as the inductor or antenna. The coils are spaced around the control mechanism, or lock, to concentrate energy transmitted or radiated thereby in the selected region. The north pole of at least one, but less than all, coils and the south poles of the remaining coils may be similarly oriented and located relative to the selected region. Alternatively, the coils may be associated with the control mechanism in diametrically opposed pairs, the poles of the coils having complementary or the same polarities. In any event, the similarly oriented and located poles are preferably generally coplanar and spaced around the control mechanism. The coils may be series or parallel electrically interconnected.

The coils are preferably tubular and may include a ferromagnetic or ferrite core. The coils may have circular or non-circular cross-sections which are chosen to shape, dimension and locate the selected region so that only the facilities (or transponder) of a key-like member which is properly positioned and/or is operating the control mechanism are included in the selected region to efficiently receive energy from the transmitter/receiver. The major axes of the tubular coils surrounding a key-operated lock are preferably generally parallel to the direction of key insertion.

The previously noted disadvantages of prior art inductors or antennas are eliminated by the present invention. The production of spurious recognition codes resulting from the superpositioning of two or more individual recognition codes in the transmitter/receiver is curtailed or eliminated. In specific lock-related embodiments, since the metal mass of the switch and its lock have been effectively removed from the interior of the inductor or antenna, its ability to radiate energy and to receive signals from the key-included facilities is not damped or attenuated. The spatial separation of the coils permits their association with various configurations and sizes of locks.

The improved inductor or antenna may be used with recognition systems in which the key-like member-included facilities simply load or attenuate the transmitter/receiver or selectively increase the energy received from the facilities. The improved inductor or antenna may also be used with a transmitter/receiver in a recognition system wherein the key-like member-included facilities return a coded signal, which may be in the form of a modulated carrier which is transmitted in half-duplex or full-duplex modes, and the facilities may be powered by the energy received from the transmitter/receiver via the improved inductor or by an on-board power source. The improved inductor hereof is usable with recognition systems include those of the TIRIS and AVI types.

BRIEF DESCRIPTION OF THE DRAWINGS

All of the Figures hereof are generalized, schematic depictions.

FIGS. 1(a)–1(c) are generalized depictions of recognition systems according to the prior art; FIGS. 1(a) and 1(b) schematically depict several different types of prior art recognition systems, and FIG. 1(c) depicts a prior art recognition system, including an inductor or antenna, which system is used in conjunction with a key-operated lock or switch and one of several keys;

FIG. 6 is a diagrammatic view of an idealized energy field produced by an ideal improved inductor or antenna according to the present invention.

DETAILED DESCRIPTION

Figure 1C:
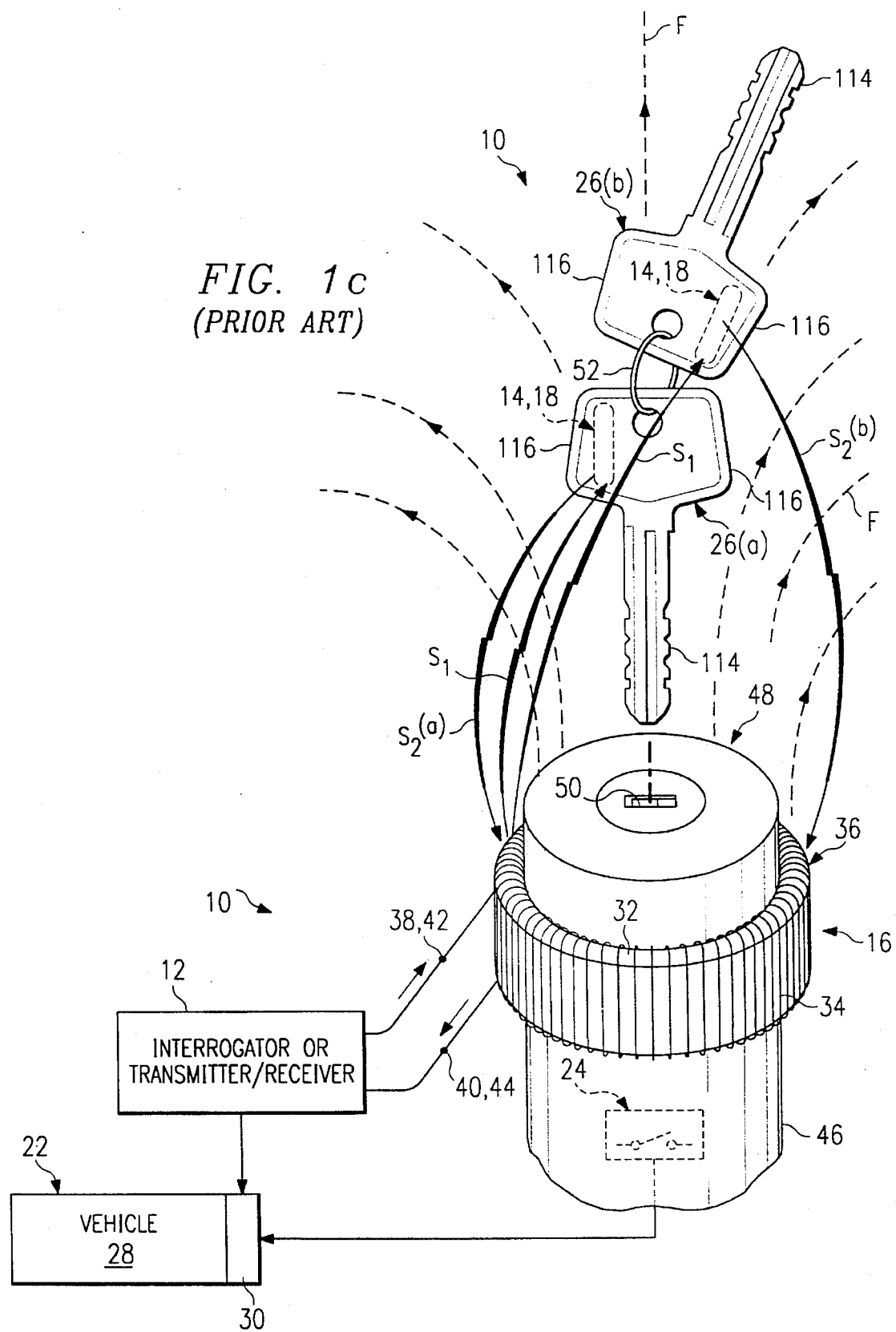

FIGS. 1(a)–1(c) generally illustrate recognition systems 10 according to the prior art. Referring first to FIG. 1 (a), such systems include a transmitter/receiver 12, often called an interrogator or a reader, and a transponder 14, sometimes referred to as a tag. The interrogator 12 is a portable or stationary unit which is capable of both transmitting and receiving energy via an included inductor or antenna 16. The transponder 14, which may be self-powered or "batteryless," is capable of receiving energy via an included inductor or antenna 18 and, as a consequence thereof, can affect the transmitter receiver 12 or transmit energy thereto via the antenna 18. The transponder 14 is usually portable and is typically associated with or attached to an item 20 which may require identification, counting, routing, sorting or the like.

In typical use, the interrogator 12 transmits via its inductor or antenna 16, either continuously or selectively, interrogation signals, in the form of electromagnetic energy, such as RF, having predetermined characteristics. Selective operation may be initiated manually by a user who perceives the item 20 and who wishes to identify, count, rout or sort the item 20. Selective operation may also be initiated by the item 20 being proximate to or moving past the interrogator 12, as is well known. A transponder 14 associated with or mounted to the item 20 may either "match" or not "match" the interrogator 12. If the transponder 14 matches, its item 20 is intended to be identified, counted, etc. If the transponder 14 does not match, its item is not intended to be identified, counted, etc.

Matching transponders 14 receive the interrogation signal via their inductors or antennas 18 and return a predetermined recognition signal, that is, they either affect the interrogator 12 in a predetermined fashion or transmit thereto a signal which is coded in a predetermined manner. Non-matching transponders 14 either do not react at all to the received energy or respond with other than the predetermined recognition signal. The interrogation signal and its related energy that are transmitted by the interrogator 12 and received by the transponder 14 are denoted S1. The recognition signal and its related energy, or the returned signal which produces the recognition signal in response to the interrogation signal S1, are denoted S2.

The transponder 14 may simply, as denoted at S2, affect the transmitter/receiver 12, for example by loading it. That is, the transponder 14 may comprise an impedance load which is inductively coupleable to the transmitter/receiver 12 via the inductors or antennas 16, 18. When the inductor or antenna 16 radiates energy, some thereof is dissipated in the transponder 14 which loads the transmitter/receiver 12. Circuitry in the receiver/transmitter 12 determines if the loading exceeds a selected level and, if it does, operates a device 22 such as a counter or an alarm because the recognition signal matches. Typical embodiments of this type of recognition system 10 include disk/tape/CD anti-theft systems often present in music retail outlets. The transponders 14 are, in this case, usually small and are encased in tags which are attached to stealable items and cannot be removed without authorization and/or special tools.

Other recognition systems 10 include transponders 14 which affect the interrogator 12 by transmitting back thereto via the inductors or antennas 16, 18 a recognition signal S2 comprising a coded signal. One such type of transponder 14 includes one or more resonant L-C branches connected to the inductor or antenna 18. The interrogator 12 produces an interrogation signal S1 which sweeps between the extremes of a frequency spectrum which includes the frequencies at which the L-C branches resonate. When the branches resonate, the energy resulting from the concomitant current increase(s)is transmitted back to the interrogator 12 as a recognition signal S2 via the inductors or antennas 16, 18. If the transmitter/receiver 12 determines that resonance occurred at predetermined frequencies, that is as a selected code, it affects the device 22 to identify, count, etc. the item 20. Such determination may be achieved by comparing S2 with a stored template identifying a matching code. This type of recognition system 10 may be used to identify or sort items such as luggage and cattle.

Other recognition systems 10 produce a coded signal S2 in a different manner. For example, The interrogation signal S1 may be RF modulated in a manner so that only certain transponders 14 will respond thereto. The recognition signal S2 produced by a transponder 14 in response to the interrogation signal received from the interrogator 12 via the inductors or antennas 16, 18 may be a code-modulated RF signal. The code may be stored in the transponder 14. If the coded signal S2 represents a match, the interrogator 12 detects this fact and operates the device 22 to identify or count the item 20. This type of recognition system 10 may operate in half-duplex or full-duplex mode. That is, in half-duplex mode, the transmitter/receiver 12 may first transmit the signal S1 and then cease such transmission to receive the signal S2 returned by the transponder 14. In full-duplex operation, the interrogation signal S1 is continuously transmitted, even when the return signal S2 is transmitted, to which end the carrier frequency of S1 and S2 may be different.

Systems 10 of the type described in the immediately foregoing paragraph may be of the TIRIS variety and may include transponders 14 which are batteryless, that is, include no on-board power supply. The circuitry of these types of transponders 14 is powered by the energy in the recognition signal S1 received from the interrogator 12 via the inductors or antennas 16, 18. In this way the transponder 14 may be made extremely small. Indeed, transponders 14 of the batteryless type are often subcutaneously implanted in livestock for purposes of later identification or counting.

The transponders 14 of any of the above systems 10 may, at the expense of smallness in size, be powered by an on-board power source. In AVI systems 10 the transponders 14 are carried within vehicles 22. In response to an interrogation signal S1 transmitted to a moving vehicle at a selected site, such as a toll booth, such transponders 14 respond with a signal S2 which informs the interrogator 12 of the identity of the vehicle 22. This information is used, in turn, to record the fact that a toll is owed in the device 22, with a bill being later sent.

In systems 10 of the AVI type, the signals S1 and S2 tend to be relatively strong because of the typical high separation between the interrogator 12 and the transponder 14. In other recognition systems 10, especially those that are batteryless, the signals S1 and S2 are relatively weaker. In either event, it is desirable for the inductors or antennas 16, 18 to efficiently effect the proper transmission and reception of the signals S1 and S2.

A variation of the above systems 10 is illustrated in FIG. 1 (*b*), which is similar to the system of FIG. 1(*a*) except that the device 22 is associated with a control mechanism 24 and the transponder 14 is associated with an operating member 26 for the control mechanism 24. In a specific example of this type of system 10, which serves an anti-theft function, the device 22 may be a vehicle 28, the control mechanism 24 may be an ignition switch which includes a key-operable lock, and the operating member 26 may be a key. The transponder 14 is of the miniature, batteryless variety and is preferably embedded in the key 26. The proximity of the inductor 18 of the transponder 14 in the key 26 to the inductor or antenna 16 of the interrogator 12 efficiently couples the inductors 16, 18 the permit the above-described transmission and reception of the signals S1 and S2. Typically, this efficient coupling occurs when the key 26 is quite close to—or ready to enter—the lock of the ignition switch 24. The vehicle 28 includes facilities, generally indicated at 30, which respond to the concurrence or coincidence of two events, namely, receipt by the interrogator 12 of a proper, matching recognition signal S2 and operation of the ignition switch 24 by the key 26. When the facilities 30 sense this coincidence, the engine of the vehicle 28 is started. If either event does not occur, the engine cannot be started by the key 26. Thus, the use of a "master" or copied key or pulling the ignition switch will not facilitate unauthorized operation of the vehicle 28.

One type of anti-theft system 10 as generally shown in FIG. 1(b) is, as it relates to the present invention, more specifically depicted in FIG. 1(c). Where the system 10 is used, with a vehicle 28, the inductor or antenna 16 by which the interrogator 12 radiates the interrogation signal or energy S1 has taken the form of a torroidal ferromagnetic or ferrite core 32 which supports a number of turns of wire 34 therearound to form a coil 36. The core 32 has at times been omitted. Terminals 38 and 40 of the coil 36 acting as a radiating and receiving inductor or antenna 16 are connected to appropriate terminals 42 and 44 of the functional transmitter and receiver portions of the interrogator 12. The coil 36 surrounds a cylinder 46 of a lock 48, operation of which operates the ignition switch 24 for the vehicle 28. The relationship of the coil 36 to the lock cylinder 46 enables the coil 36 to radiate energy to and receive energy from the inductor or antenna 18 of the transponder 14 located in a key 26 which is inserted into, or is about to be inserted into, a keyhole 50 of the lock 48. The energy radiated and received by the coil 36 is represented in FIG. 1(c) by the legends S1 and S2, as well as by field lines F.

As shown in FIG. 1(c), two keys 26(a) and 26(b) are held on a key-ring 52. The key 26(a), which is about to be inserted into the keyhole 56, carries a transponder 14. The energy, represented by S1 and F, radiated by the coil 36 is received by the transponder 14 via its inductor or antenna 18, which results in the transponder 14 returning its recognition signal, represented by S2. If the recognition signal S2 received by the interrogator 12 from the transponder 14 represents a match, and if the key 26(a) properly operates the lock 48 and the ignition switch 24, the coincidence facilities 30 permit operation of the switch 24 to start the engine of the vehicle 28. If a non-matching recognition signal S2 is produced, or, if the lock 48 is not properly operated by the key 26(a), the facilities 30 do not permit the engine to be started.

It has been found that the second key 26(b) can result in mis-operation of the above type of system 10. Specifically, although the key 26(b) is intended to operate the ignition switch of another vehicle, it may be similar to the key 26(a) and contain a transponder 14 which will produce a recognition signal, albeit a non-matching recognition signal, in response to the receipt of the interrogation signal S1. If the interrogation signal S1 reaches both transponders 14 in both keys 26(a) and 26(b), two superimposed recognition signals S2(a) and S2(b) will reach the coil 36 for analysis by the functional receiver of the interrogator 12. The interrogator 12 may determine that the superimposed recognition signals S2(a)+S2(b) is non-matching. As a result, even though the matching key 26(a) properly operates the ignition switch 24, the facilities 30 will not permit the engine to start.

It has also been determined that in the prior art system 10 of FIG. 1(c) the ability of the coil 36 to transmit the interrogation signal S1 and to receive the recognition signal S2 is attenuated or otherwise adversely affected by the metallic mass of the lock cylinder 46 encircled by the coil 36.

Additionally, lock cylinders 46 have varying diameters in different brands of vehicles 28. Accordingly, the system 10 must contain different diameters of coils 36 to accommodate different lock cylinders 46.

As generally depicted in FIGS. 1 and 6, an inductor or antenna 100 according to the present invention for use in the system 10, which inductor or antenna 100 provides as its major advantage the ability to optimally configure and locate the field 102 thereof so as to restrict the interchange of the interrogation signal S1 and the recognition signal S2 to that between the interrogator 12 and the most proximate key 26, typically only the key 26 being inserted into the keyhole. The inductor or antenna 100 of the present invention also avoids the attenuative effects of the cylinder 46 of the lock 48 and avoids the need to provide varying coils 36 for different models of vehicles 28.

Figure 2:
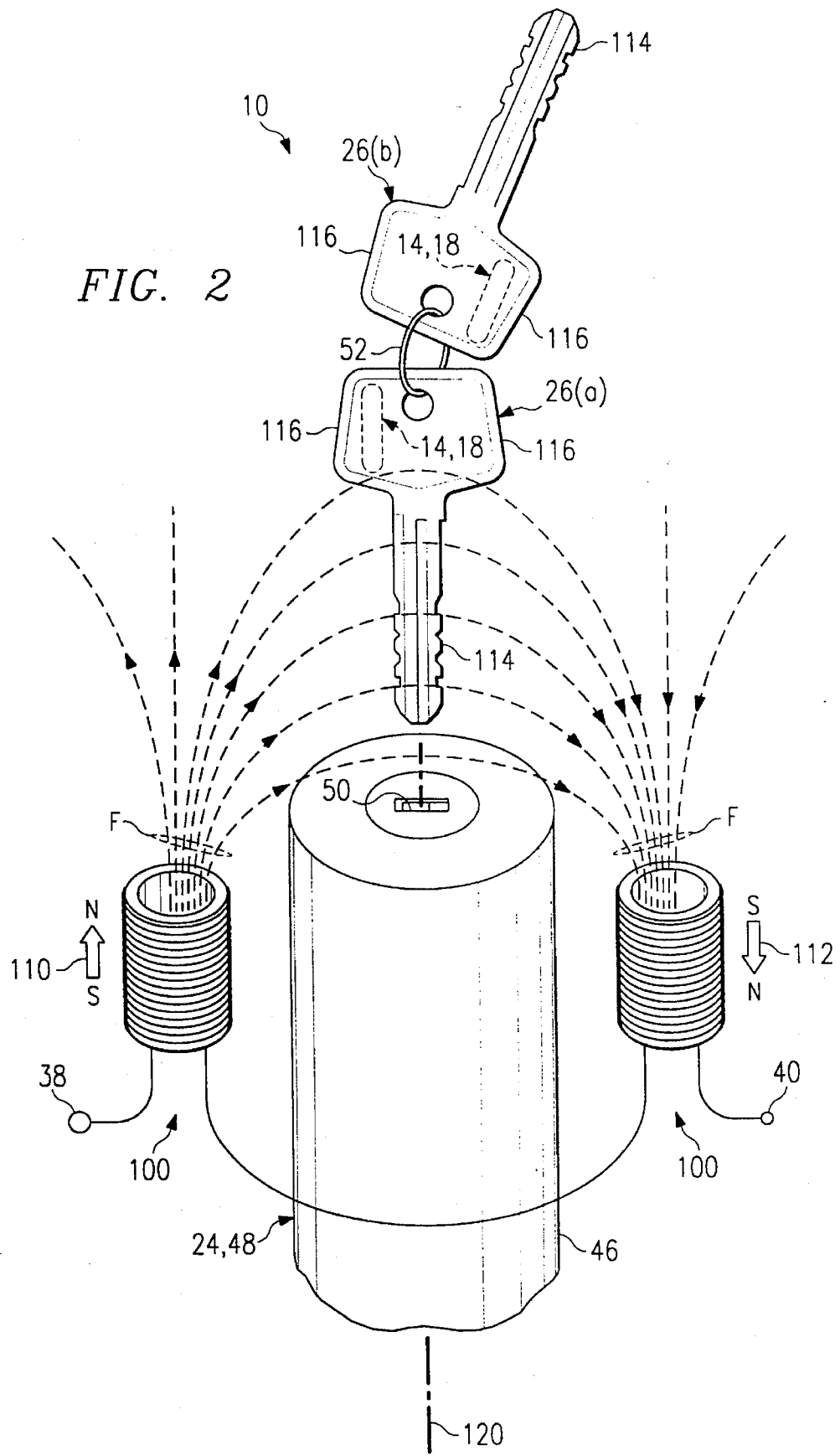
FIG. 2 is a generalized depiction of one embodiment of an improved inductor or antenna according to the present invention which is intended to replace that of FIG. 1.

Referring to FIG. 2, in is simplest form the improved inductor or antenna 100 according to the present invention comprises two coils 102 and 104 which are connected together in series or in parallel (only a series connection is shown) between the terminals 38, 40 which are connectable to the terminals 42, 44 of the interrogator 12, not shown in FIG. 2. The coils 102 and 104 may comprise plural turns of wire 106 which may be supported on a ferromagnetic or ferrite core 108. The coils 102, 104 are generally diametrically located adjacent to the cylinder 46 of the lock 48, with their major axes (and the magnetic poles generally located thereon) being "aimed" so as to be generally parallel to the direction of insertion of a key 26 into the key-hole 50. The foregoing assumes that the key 26 usable in the lock 48 is the typical planar member which is coplanar with the line of movement of the key 26 into the key-hole 50. Using this type of typical key 26 causes the transponder 14 therein to similarly reside in the same plane as the line of key-insertion movement. As will be explained shortly, the above-described aiming of the poles of the coils 102, 104 maximizes the strength of the interrogation signal S1 and its field at the location of a key 26 being inserted into the key-hole 50 and minimizes the signal S1 and its field at other locations, for example those occupied by the transponders 14 in other keys 26. If the key 26 has a deviant configuration, the poles of the coils 26 may be otherwise aimed to achieve the above effect.

As shown in FIG. 2, the coils 102, 104 may be oriented so that complementary poles, that is, one north and one south pole, are adjacent to or generally coplanar with the key-hole 50. North poles are represented by the tips of the polarity arrows 110, 112 and south poles are represented by the other ends of the arrows 110, 112. The coils 102, 104 may also be oriented so that the same poles of each are adjacent to the key-hole 50.

It has been found that the use of the inductor or antenna 100 which comprises the separate coils 102, 104 spaced around the lock cylinder 46 produces a field which is concentrated in externally of the lock 48 immediately above the key-hole 50 and in the location occupied by the transponder 14 in the typical key 16. The foregoing is diagrammatically illustrated by the closely spaced field lines F. Further, it has been found that the field of the inductor or antenna 100 at locations remote from the key-hole 50 and possibly also occupied by other keys 26 is relatively much weaker, as illustrated by the paucity of field lines F. Those skilled in the art will appreciate that the diameters and lengths of the coils 102, 104, the number of wire turns 106, the size and material of the cores 106, the relationship of the poles of the coils 102, 104 (which depends on the winding "sense" of each coil), and the location of the coils 102, 104 relative to the position of the transponder 14 of a key 26 being inserted into the lock 48 may, inter alia, be adjusted to achieve the foregoing field characteristics. In any event, with the field the strongest at the location of a transponder 14 in a key 26(*a*) being inserted into the lock 48, the likelihood that the transponder 14 in another nearby key 26(*b*) will respond to an interrogation signal S1 and/or produce an effective recognition signal S2 is quite remote, if not nonexistent.

FIG. 6 illustrates the type of field to be produced by the improved inductor or antenna 100 where the key 26 used to operate the lock 48 is the type of typical key 26 discussed above. Specifically, where the key 26 is generally planar and includes a lock-tumbler-operating, toothed portion 114 and integral finger-manipulable wings 116, the transponder 14 may be implanted in one of the wings 116, as shown in FIG. 2. Thus, when the portion 114 is inserted into the lock 48 and the key 26 is rotated by manipulation of the wings 116 to operate the lock 48 and the associated ignition switch 24, the transponder 14 "sweeps out" an arcuate volume 118 located off the axis 120 of key rotation. The improved inductor or antenna 100 will, as described above, maximize or limit its field to within this volume 118 and minimize or not produce a field outside of the volume 118. In some U.S.-manufactured vehicles 28, the key 26 is insertable into the lock 48 in only one orientation relative to the key-hole 50. In this event, the field of interest of the improved inductor or antenna 100 is limited to only the volume 118. In other U.S.-manufactured vehicles 28, and in vehicles 28 manufactured in Europe and Japan the key 26 is insertable into the lock 48 in either of two positions. In this latter event, the field of the inductor or antenna 100 must be produced in the volume 118 and in a complementary, diametrically opposed volume 122, because the transponder 14 may sweep out a volume on either side of the axis 120 of key rotation depending on the manner in which the key 26 is inserted into the key-hole 50.

Figure 3:
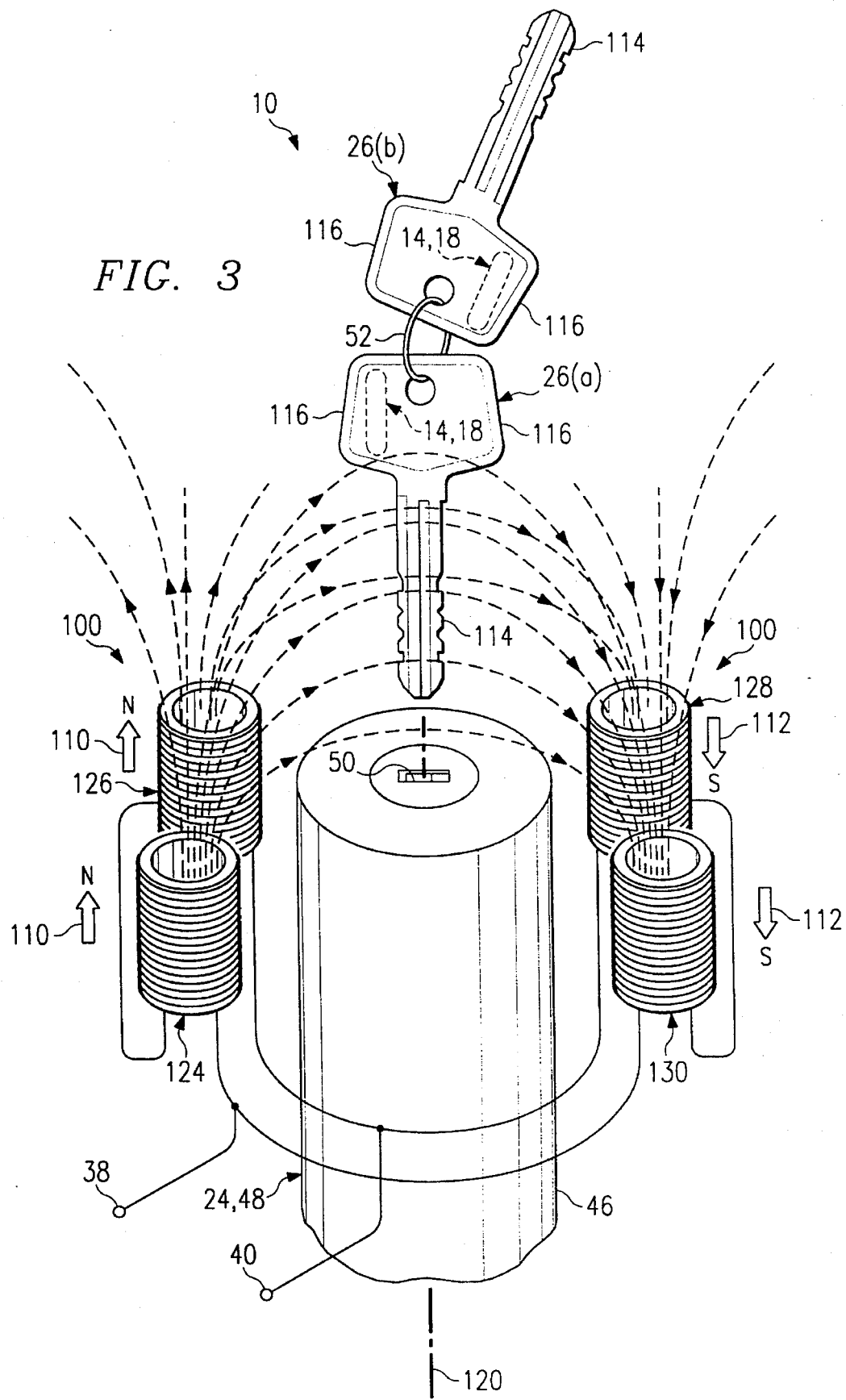
FIG. 3 is a generalized depiction of another embodiment of an improved inductor or antenna according to the present invention.

The improved inductor or antenna 100 may include more than two coils, four coils 124, 126, 128, 130 being depicted in FIG. 3. There may be an odd or even number of coils in electrical series and/or in parallel, and the coils' magnetic poles may be in complementary, the same or a mixture of positions relative to each other. In FIG. 3, the coils 124 and 126 are in electrical series and both of their north poles are "up." The coils 128 and 130 are also in electrical series and both of their south poles are "up." the coil pairs 124, 126 and 128, 130 are in parallel between the terminals 38 and 40. The field F of the inductor or antenna 100 is concentrated in those locations occupied by the transponder 14 of a key 26 operating the lock 48. As illustrated by the embodiment of FIG. 3, the number of coils constituting the inductor or antenna 100, as well as the other factors noted earlier, may be varied to selectively configure and locate the field thereof.

Figure 4:
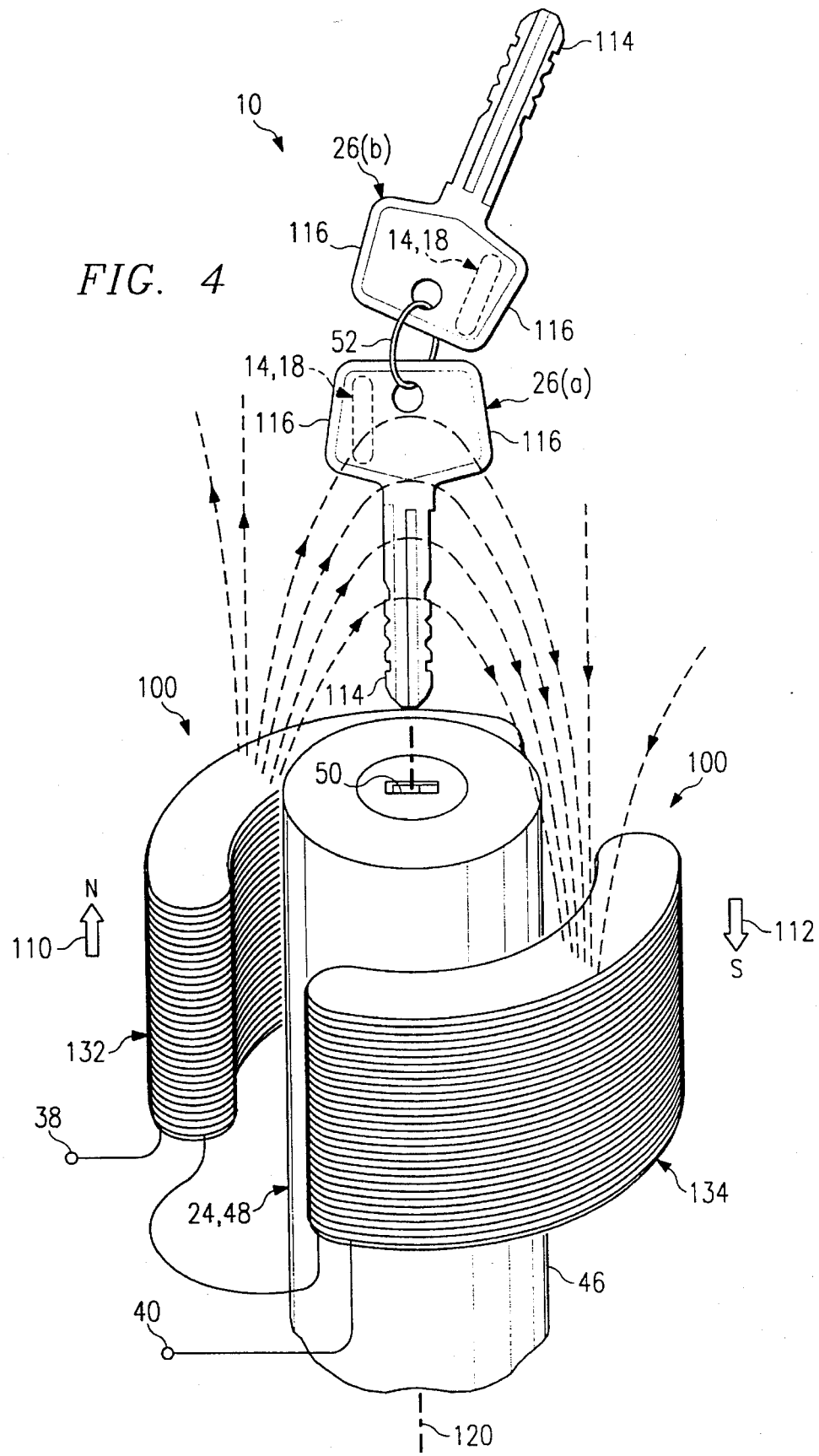
FIG. 4 is a generalized depiction of a third embodiment of an improved inductor or antenna according to the present invention.

Another variable affecting the configuration and location of the field of the inductor or antenna 100 is the shape of the coil 36. Such shape may be varied by varying the shape of the core 32 or of the wound wire if no core 32 is used. FIG. 4 shows one such shape which has been found to be particularly effective in maximizing and minimizing the field of the inductor or antenna 100 for use with a key-operated lock 48. Specifically, coils 132 and 134 have generally annular or torroidal cross-sections and are generally complementary or conformal with a portion of the exterior of the lock cylinder 46. The fields produced by the coils 132, 134 have selected configurations and locations, such as those exhibited by the volumes 118 and 122 of FIG. 6. The coils 132, 134 are shown in electrical series, but may be connected in parallel. Also more than two coils may be used, and the various north and south poles of the coils may be oriented as set forth above.

Figure 5:
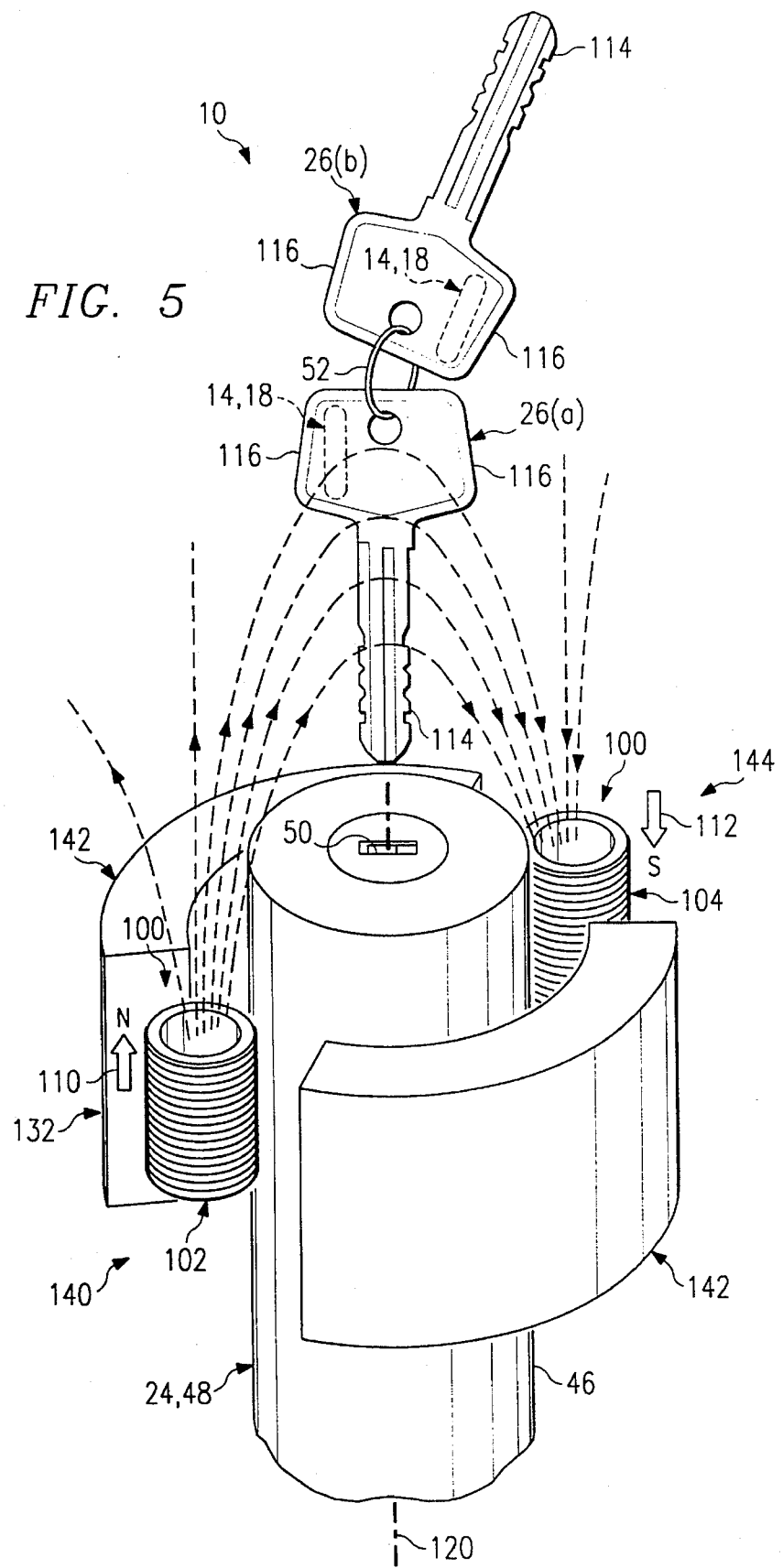
FIG. 5 is a generalized depiction of cover or shield facilities which may be used in conjunction with the inductors or antennas of FIGS. 2 through 4, according to the present invention.

FIG. 5 depicts additional facilities 140 for controlling the field produced by the inductor or antenna 100. These facilities 140 are shown in combination with the embodiment of FIG. 2, but may be used with any embodiments of the present invention.

The facilities 140 comprise ferromagnetic or ther metal members or covers 142 which may be shaped like segments of an annulus. The covers 142 partially encircle the lock cylinder 46 above the tops of the coils 102, 104 and block the portion of the field produced by the coils 102, 104 immediately below and aligned with the covers 142. Windows 144, which are defined between the covers 142 permit radiation not blocked by the covers to emanate from the coils 102, 104 or to be received from the transponder 14 by the coils 102, 104. The covers 142 may partly overlie the poles of the coils 102, 104, or may be located to the side thereof. The covers 142 are effective to limit the field produced at distances remote from the key-hole 50, thus reducing the likelihood that the transponder 14 in a key 26 other than one being inserted into the lock 48 will respond to the interrogation signal S1 transmitted by the interrogator 12. As should be clear, the shape, material, size and position (with respect to the coils 102, 104) of the covers 142, and the size and shape of the windows 144, may all be varied to affect the transmitting and receiving efficacy of the inductor or antenna 100 at locations remote from the lock 48.

While various embodiments of the present invention have been described, those skilled in the art will appreciate that these embodiments, as well as numerous other embodiments and modifications, are within the scope of the following claims.

What is claimed is:

1. An improved inductor/antenna for a transmitter/receiver associated with a control mechanism which is operable by a properly positioned, matching member to control a device; the matching member and other non-matching members containing facilities each of which, when receiving energy transmitted from the transmitter/receiver via the inductor/antenna, produce a respective unique recognition signal in the transmitter/receiver; control of the device being possible only upon simultaneous occurrence of both operation of the control mechanism and production of a recognition signal by the matching member; wherein the improvement comprises:

at least one inductor/antenna placed adjacent the control mechanism to concentrate the energy radiated thereby in a selected region, for maximizing at said selected region external to the control mechanism the energy transmitted by the inductor/antenna and for minimizing the inductor/antenna-transmitted energy at regions other than the selected region to maximize the probability that the recognition signal is produced only by the facilities contained by a member in the selected region even though one or more other members are nearby in regions other than the selected region.

2. An improved inductor/antenna as in claim 1, wherein:

the selected region generally coincides with the location of the facilities in a member which is properly positioned to operate the control mechanism.

3. An improved inductor/antenna as in claim 1, wherein:
the selected region generally coincides with the location of the facilities in a member which is operating the control mechanism.

4. An improved inductor/antenna as in claim 1, wherein:
the selected region generally coincides with all possible locations of the facilities in a member which is properly positioned to operate the control mechanism or is operating the control mechanism.

5. An improved inductor/antenna as in claim 1, wherein:
a plurality of electrically interconnected coils function as the inductor/antenna, the coils being spaced around the control mechanism to concentrate the energy radiated thereby in the selected region.

6. An improved inductor/antenna as in claim 5, wherein:
the north pole of at least one, but not all, coils and the south poles of the remaining coils are similarly oriented and located relative to the selected region.

7. An improved inductor/antenna as in claim 6, wherein:
the similarly oriented and located north and south poles are generally co-planar and generally spaced around the control mechanism.

8. An improved inductor/antenna as in claim 6, wherein:
there are equal numbers of the similarly oriented and located north and south poles.

9. An improved inductor/antenna as in claim 5, wherein:
the same poles of all the coils are similarly oriented and located relative to the selected region.

10. An improved inductor/antenna as in claim 9, wherein:
the similarly oriented and located poles are generally co-planar and generally spaced around the control mechanism.

11. An improved inductor/antenna as in claim 5, wherein:
the coils are tubular.

12. An improved inductor/antenna as in claim 5, wherein:
the plurality of electrically interconnected coils further comprises;
one or more metallic members defining windows overlying the poles of selected coils, the size and shape of the windows being selected to limit the energy which is radiated by the overlain coils to regions other than the selected region.

13. An improved inductor/antenna as in claim 5, wherein:
when an operating member is properly positioned or is operating the control mechanism, its facilities may occupy a number of locations, and
the selected region encompasses the locations occupied by the facilities of the operating member.

14. An improved inductor/antenna as in claim 1, wherein:
the recognition signal comprises a first signal effected by the facilities in response to the facilities' receipt of energy from the inductor/antenna, the first signal being produced in the transmitter/receiver by energy received from the facilities via the inductor/antenna, and
the transmitter/receiver includes means for analyzing the first signal to determine if it is the unique recognition signal effected by the facilities in the matching operating member.

15. An improved inductor/antenna as in claim 14, wherein:
the facilities-effected first signal represents the effect of the facilities on a second signal produced in the facilities by the received energy.

16. An improved inductor/antenna as in claim 15, wherein:
the first signal represents the loading effect of the facilities on the transmitter/receiver.

17. An improved inductor/antenna as in claim 14, wherein:
the facilities include
means for effecting the first signal as a predetermined code in response to a second signal produced in the facilities by the received energy.

18. An improved inductor/antenna as in claim 17, wherein:
the first signal is received and analyzed by the transmitter/receiver after the inductor/antenna has ceased radiating energy to the facilities.

19. An improved inductor/antenna as in claim 17, wherein:
the first signal is received and analyzed by the transmitter/receiver while the inductor/antenna is radiating energy to the facilities.

20. An improved inductor/antenna for a transmitter/receiver associated with a lock which is operable by an inserted matching key to control a device; the matching key and other non-matching keys each containing facilities which, when receiving energy radiated by the transmitter/receiver via the inductor/antenna while the key is in the vicinity of the lock, produce a unique recognition signal in the transmitter/receiver; control of the device being possible only upon simultaneous occurrence of both operation of the lock and production of a recognition signal by the matching key; wherein the improvement comprises:
at least one inductor/antenna placed adjacent the control mechanism to concentrate the energy radiated thereby in a selected region, for maximizing at said selected region external to the lock the energy radiated by the inductor/antenna and for minimizing the inductor/antenna-radiated energy at other regions external to the lock to maximize the probability that the recognition signal is produced only by the facilities contained by a key in the selected region even though one or more other keys are nearby in the other regions.

21. An improved inductor/antenna as in claim 20, wherein:
the selected region is proximate to the point of insertion of a key into the lock, and
the other regions are more remote from the point of insertion but are in the vicinity thereof.

22. An improved inductor/antenna as in claim 20, wherein:
the selected region generally coincides with the location of the facilities in a key which is inserted into the lock.

23. An improved inductor/antenna as in claim 20, wherein:
the selected region generally coincides with the location of the facilities in a key which is operating the lock.

24. An improved inductor/antenna as in claim 20, wherein:
the selected region generally coincides with the locations of the facilities in a key which is inserted in the lock and which is operating the lock.

25. An improved inductor/antenna as in claim 20, wherein:
a plurality of electrically interconnected coils function as the inductor/antenna, the coils being spaced around the lock to concentrate the energy radiated thereby in the selected region.

26. An improved inductor/antenna as in claim 25, wherein:

the north pole of at least one, but not all, coils and the south poles of the remaining coils are similarly oriented and located relative to the selected region.

27. An improved inductor/antenna as in claim 26, wherein:

the similarly oriented and located poles are generally co-planar and generally spaced around the lock.

28. An improved inductor/antenna as in claim 26, wherein:

there are equal numbers of similarly oriented and located north and south poles.

29. An improved inductor/antenna as in claim 25, wherein:

the same poles of all the coils are similarly oriented and located relative to the selected region.

30. An improved inductor/antenna as in claim 20, wherein:

the plurality of electrically interconnected coils comprises a pair of coils functioning as the inductor/antenna, the coils being located at generally opposite sides of the lock to concentrate the energy radiated thereby in the selected region.

31. An improved inductor/antenna as in claim 30, wherein:

the coils are in electrical series.

32. An improved inductor/antenna as in claim 30, wherein:

the coils are electrically parallel.

33. An improved inductor/antenna as in claim 30, wherein:

the north pole of one coil and the south pole of the other coil are similarly oriented and located relative to the point of insertion of a key into the lock.

34. An improved inductor/antenna as in claim 33, wherein:

the similarly oriented and located north and south poles are generally co-planar and generally diametrically opposed.

35. An improved inductor/antenna as in claim 30, wherein:

the same poles of both coils are similarly oriented and located relative to the point of insertion of a key into the lock.

36. An improved inductor/antenna as in claim 35, wherein:

the similarly oriented and located poles are generally co-planar and generally diametrically opposed.

37. An improved inductor/antenna as in claim 30, wherein:

the coils are tubular.

38. An improved inductor/antenna as in claim 37, wherein:

the coils are generally cylindrical, and the major axes of the coils are generally parallel to the direction of insertion of a key into the lock.

39. An improved inductor/antenna as in claim 38, wherein:

the coils each,surround a respective ferromagnetic core.

40. An improved inductor/antenna as in claim 39, wherein:

each core is a ferrite.

41. An improved inductor/antenna as in claim 30, wherein:

the plurality of electrically interconnected coils further comprises one or more metallic members generally partially surrounding the lock and defining windows overlying the poles of the coils, the size of the windows being selected to limit the energy which is otherwise radiated by the coils remotely from the point of insertion of a key into the lock.

42. An improved inductor/antenna as in claim 30, wherein:

the coils have cross-sections shaped so that the selected region assumes a selected configuration and size.

43. An improved inductor/antenna as in claim 42, wherein:

the selected region generally coincides with the location of the facilities in a key which is inserted in the lock.

44. An improved inductor/antenna as in claim 42, wherein:

the selected region generally coincides with the location of the facilities in a key which is operating the lock.

45. An improved inductor/antenna as in claim 42, wherein:

the selected region generally coincides with all possible locations of the facilities in a key which is inserted in the lock and is operating the lock.

46. An improved inductor/antenna as in claim 42, wherein:

the coils have circular cross-sections resulting in the selected region being configured as a restricted volume which is immediately superjacent to the point of insertion of a key into the lock.

47. An improved inductor/antenna as in claim 42, wherein:

the coils have non-circular cross-sections resulting in the selected region being configured as a volume immediately superjacent to, but surrounding and more extensive than, the point of insertion of a key into the lock.

48. An improved inductor/antenna as in claim 30, wherein:

the recognition signal comprises a first signal produced by the facilities in response to the receipt of energy from the inductor/antenna, the first signal being received by the transmitter/receiver via the inductor/antenna, and the transmitter/receiver includes means for analyzing the first signal to determine if it is the unique recognition signal produced by the facilities in the matching key.

49. An improved inductor/antenna as in claim 48, wherein:

the facilities-produced first signal represents the effect of the facilities on a second signal produced in the facilities by the received energy.

50. An improved inductor/antenna as in claim 48, wherein:

the facilities include means for producing the first signal as a predetermined code in response to a second signal produced in the facilities by the received energy.

51. An improved inductor/antenna as in claim 50, wherein:

the first signal is received and analyzed by the transmitter/receiver after the inductor/antenna has, ceased radiating energy to the facilities.

52. An improved inductor/antenna as in claim 50, wherein:

the first signal is received and analyzed by the transmitter/receiver while the inductor/antenna is radiating energy to the facilities.

* * * * *